United States Patent
Blonn et al.

(10) Patent No.: US 8,176,722 B2
(45) Date of Patent: May 15, 2012

(54) METHOD AND DEVICE FOR THE TRANSFER OF HEAT FROM A HEAT SOURCE TO A THERMODYNAMIC CYCLE WITH A WORKING MEDIUM OF AT LEAST TWO SUBSTANCES WITH NON-ISOTHERMAL EVAPORATION AND CONDENSATION

(75) Inventors: Jann Blonn, Erlangen (DE); Jörg Lengert, Lonnerstadt-Ailsbach (DE); Kathrin Ruhsland, Adelsdorf/OT Aisch (DE)

(73) Assignee: Siemens Aktiengesellschaft, Munich (DE)

( * ) Notice: Subject to any disclaimer, the term of this patent is extended or adjusted under 35 U.S.C. 154(b) by 1096 days.

(21) Appl. No.: 11/658,903

(22) PCT Filed: Jul. 28, 2005

(86) PCT No.: PCT/EP2005/053690
§ 371 (c)(1), (2), (4) Date: Jan. 30, 2007

(87) PCT Pub. No.: WO2006/013186
PCT Pub. Date: Feb. 9, 2006

(65) Prior Publication Data
US 2009/0205336 A1 Aug. 20, 2009

(30) Foreign Application Priority Data

Jul. 30, 2004 (DE) .......................... 10 2004 037 417

(51) Int. Cl.
*F01K 23/04* (2006.01)
(52) U.S. Cl. ...................... 60/39.181; 60/784
(58) Field of Classification Search .............. 60/39.181, 60/39.183, 39.182, 39.5, 39.511, 784, 655, 60/649; 165/104.11
See application file for complete search history.

(56) References Cited

U.S. PATENT DOCUMENTS 5,715,682 A * 2/1998 Nakata ............................. 60/655
5,860,279 A * 1/1999 Bronicki et al. ................. 60/655
(Continued)

FOREIGN PATENT DOCUMENTS

DE 100 08 125 A1 8/2001
(Continued)

OTHER PUBLICATIONS

D. Bies, "Verdichtungsluftkuehlung MIT Absorptionskaeltetechnik", BWK BrennstoffWarme Kraft, Springer VDI Verlag, Dusselfdorf, Germany, vol. 56, No. 6, 2004, pp. 66-70. XP001196599.
(Continued)

*Primary Examiner* — Louis Casaregola
*Assistant Examiner* — Vikansha Dwivedi

(57) ABSTRACT

The invention relates to a thermodynamic circuit with a working medium comprising at least two substances with non-isothermal evaporation and condensation whereby the working medium can decompose above a given temperature. According to the invention, the heat from heat sources at temperatures above the decomposition temperature of the working medium may be made useful with little complexity and with high operational security, whereby the heat from the heat source is transferred in a first step to a hot liquid circuit and, in a second step, from the hot liquid circuit to the circuit with the working medium comprising at least two substances with non-isothermal evaporation and condensation. The heat introduced to the circuit with the working medium comprising at least two substances with non-isothermal evaporation and condensation can be reduced by means of the intermediate hot liquid circuit, such that a decomposition of the working medium can be avoided. Furthermore, the circuit with the working medium comprising at least two substances with non-isothermal evaporation and condensation is embodied as a standardized solution for use with differing heat sources each at differing temperatures, whereby matching to the temperature of the heat source is achieved by means of the intermediate hot liquid circuit.

20 Claims, 2 Drawing Sheets

U.S. PATENT DOCUMENTS

| | | | |
|---|---|---|---|
| 6,209,307 B1 * | 4/2001 | Hartman | 60/780 |
| 6,910,334 B2 * | 6/2005 | Kalina | 60/651 |
| 7,305,829 B2 * | 12/2007 | Mirolli et al. | 60/649 |
| 7,493,768 B2 * | 2/2009 | Klaus et al. | 60/772 |
| 2002/0053196 A1 | 5/2002 | Lerner et al. | |
| 2004/0055302 A1 | 3/2004 | Kalina | |

FOREIGN PATENT DOCUMENTS

| | | |
|---|---|---|
| DE | 10 2004 006 837 A1 | 8/2005 |
| EP | 0 652 368 B1 | 5/1999 |
| EP | 1016775 B1 | 7/2000 |
| EP | 1 306 526 A1 | 5/2003 |
| RU | 2236605 C2 | 9/2003 |
| RU | 2215165 C2 | 10/2003 |

OTHER PUBLICATIONS

W. Gajewski et al., "Der Kalina-Prozess", VGB Kraftwerkstechnik, VGB Kraftwerkstechnik GmbH, Essen, Germany, vol. 69, No. 5, May 1, 1989, pp. 477-483, XP000028691.

* cited by examiner

METHOD AND DEVICE FOR THE TRANSFER OF HEAT FROM A HEAT SOURCE TO A THERMODYNAMIC CYCLE WITH A WORKING MEDIUM OF AT LEAST TWO SUBSTANCES WITH NON-ISOTHERMAL EVAPORATION AND CONDENSATION

CROSS REFERENCE TO RELATED APPLICATIONS

This application is the US National Stage of International Application No. PCT/EP2005/053690, filed Jul. 28, 2005 and claims the benefit thereof. The International Application claims the benefits of German application No. 10 2004 037 417.1 filed Jul. 30, 2004, both of the applications are incorporated by reference herein in their entirety.

FIELD OF INVENTION

The invention relates to a method and to a device for the transfer of heat from a heat source to a thermodynamic cycle with a working medium comprising at least two substances with non-isothermal evaporation and condensation.

BACKGROUND OF THE INVENTION

A wide variety of different technologies have been developed in the last few years for heat sources with temperatures from 100° C. to 200° C. and these allow the heat thereof to be converted into mechanical or electrical energy very efficiently. It is primarily thermodynamic cycles with a working medium comprising at least two substances with non-isothermal evaporation and condensation, such as the Kalina cycle, which are distinguished by particularly high levels of efficiency. Kalina cycles, as are known for example from EP 0652 368 B1, use a mixture of ammonia and water as the working medium, with the non-isothermal boiling and condensation process of the mixture being exploited to increase the efficiency of the cycle, for example compared with the conventional Rankine cycle.

Since the working medium used can decompose above a certain temperature however (hereinafter called the "decomposition temperature") use of cycles of this type with heat sources with temperatures above the decomposition temperature turns out to be difficult. In the case of the Kalina cycle with an ammonia-water mixture as the working medium, the ammonia-water mixture begins to decompose above 250° C., i.e. there is chemical break up of the NH3 compound (2 NH3→N2+3H2), so hydrogen and nitrogen are liberated. For this reason the cycle does not operate above temperatures of 400° C.

On the other hand, however, use of such cycles is also attractive in specific cases for heat sources with temperatures of above 400° C. This applies for example to gas turbine plants, constructed in the past, without steam generation and to combined gas and steam turbine plant. As a result of enormous cost pressures, in particular the operators of old plant with low efficiency levels are forced to improve the economic efficiency of their plant.

SUMMARY OF INVENTION

The object of the present invention is therefore to disclose a method and a device for the transfer of heat from a heat source to a thermodynamic cycle with a working medium comprising at least two substances with non-isothermal evaporation and condensation which with little complexity and high operational security allow the heat from heat sources even at temperatures above the decomposition temperature of the working medium of the cycle to be made useful.

The solution to the object directed toward the method succeeds according to the invention by way of a method according to the claims. Advantageous embodiments of the method are the subject matter of the subclaims. The solution to the object directed toward the device succeeds by way of a device according to the claims. Advantageous embodiments of the device are the subject matter of the subclaims. A gas turbine plant comprising a device of this type is also the subject matter of the claims.

In the method according to the invention the heat from the heat source is transferred in a first step to a hot liquid cycle and in a second step from the hot liquid cycle to the cycle with the working medium comprising at least two substances with non-isothermal evaporation and condensation. By interconnecting the hot liquid cycle between the heat source and the cycle with the working medium comprising at least two substances with non-isothermal evaporation and condensation the temperature of the heat source may be reduced to the extent that overheating of the working medium comprising at least two substances with non-isothermal evaporation and condensation may be reliably avoided.

A hot liquid cycle is in this connection taken to mean a cycle with a hot liquid, such as a hot water cycle.

The cycle with the working medium comprising at least two substances with non-isothermal evaporation and condensation may also be easily adjusted to heat sources of different temperature by the interconnected hot liquid cycle. As a result it is possible to use a standardized and therefore inexpensive solution for the cycle with the working medium comprising at least two substances with non-isothermal evaporation and condensation for a large number of applications, i.e. heat sources of different temperature. Adjustment of this standardized solution to the various heat sources takes place merely by way of the interconnected hot liquid cycle.

The cycle with the working medium comprising at least two substances with non-isothermal evaporation and condensation is preferably a Kalina cycle, with a two-substance mixture of ammonia and water being used as the working medium.

According to an advantageous embodiment of the method according to the invention the temperature of the liquid in the hot liquid cycle has substantially the evaporation temperature of the working medium comprising at least two substances with non-isothermal evaporation and condensation. "Substantially" is in this connection taken to mean that the temperature differs from the evaporation temperature by a maximum of 5%.

The device according to the invention for the transfer of heat from a heat source to a thermodynamic cycle which has a working medium comprising at least two substances with non-isothermal evaporation and condensation comprises a hot liquid cycle with a first heat exchanger for transferring heat from the heat source to the hot liquid cycle and a second heat exchanger for transferring heat from the working medium of the hot liquid cycle to the cycle with the working medium comprising two substances with non-isothermal evaporation and condensation.

The advantages stated for the method according to the invention apply accordingly to the device according to the invention as well.

A particularly advantageous use of the method according to the invention and the device according to the invention is produced in a gas turbine plant. The residual heat contained in the waste gases of the gas turbine may be made useful hereby by the transfer to a cycle with a working medium comprising at least two substances with non-isothermal evaporation and condensation, it being possible to uncouple the heat directly from the waste gases of the gas turbine that are between 400° C. and 650° C., without the risk of the working medium overheating. New possibilities of improving the efficiency of new, but in particular also old, gas turbines and combined gas and steam turbine plants are thereby provided.

To improve the efficiency in existing plants, they merely have to be retrofitted with a hot water cycle and a Kalina cycle for example. Open gas turbine plants can be retrofitted directly with the hot water cycle and the Kalina cycle. In existing combined gas and steam turbine plant the steam cycle may be replaced by the hot water cycle and the Kalina cycle. The heat of the flue gases from the gas turbines can thus be used with a high level of efficiency for power generation. The heat from the hot water cycle may also be sued for a district heating supply. Higher electrical output or mechanical output, and therefore a higher level of efficiency in the gas turbine plant, is therefore possible with the same quantity of fuel. This also leads to a reduction in the quantity of CO2 expelled per kWh of electrical energy produced.

In gas turbine plants, the increase in efficiency is possible in this connection without intervening in the main plant since the heat exchanger of the hot water cycle only has to be installed at the waste gas-side, i.e. in the waste gas line of the gas turbine plant. Retrofitting of this heat exchanger, the hot water cycle and the Kalina cycle is therefore possible with little complexity within the framework of inspection of the main plant.

The temperature of the hot water, and therefore the pressure in the hot water cycle, can, at, for example, 200 to 220° at 15 to 35 bar, lie in ranges which are significantly lower than in the case of conventional live steam conditions (for example 500° C. at 100 bar). The requirements made of the materials being used are significantly lower as a result, and this is connected with considerable cost advantages.

BRIEF DESCRIPTION OF THE DRAWINGS

The invention and further advantageous embodiments of the invention according to features of the subclaims will be described in more detail hereinafter in the figures with reference to embodiments, in which;

DETAILED DESCRIPTION OF INVENTION

Figure 1:
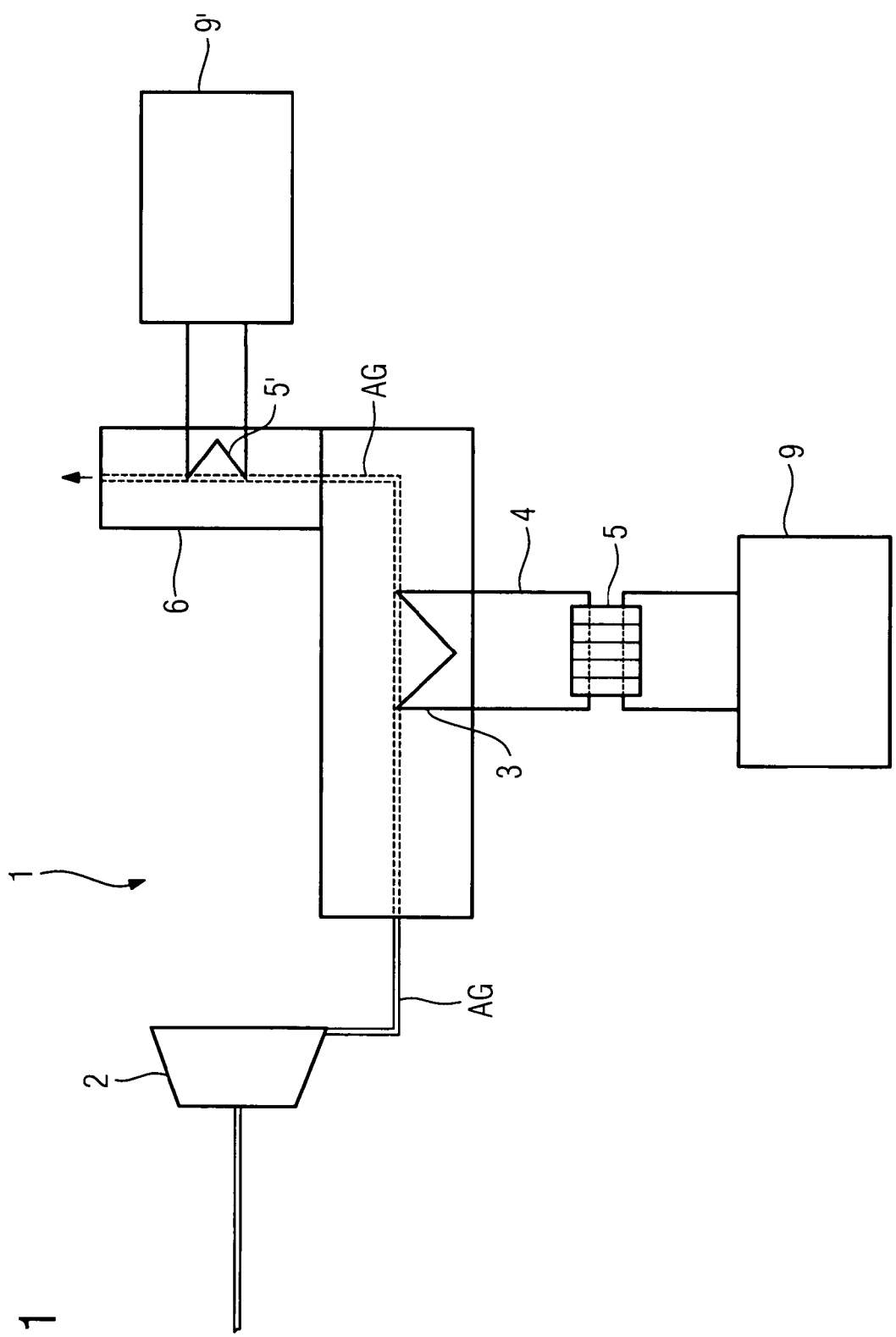
FIG. 1 shows a basic diagram of a device according to the invention, with hot waste gases from a gas turbine being used as the heat source

In a basic and simplified diagram FIG. 1 shows a gas turbine plant 1 with a gas turbine 2, operated in an open gas turbine process, and a first heat exchanger 3 arranged in a waste gas line AG of the gas turbine 2, i.e. through which hot waste gases AG from the gas turbine 2 flow, for the transfer of heat from the waste gases AG to water of a closed hot water cycle 4. The water of the hot water cycle is heated by the transfer of heat.

A second heat exchanger 5 for the transfer of heat from the hot water cycle to a Kalina cycle 9 is also connected into the hot water cycle 4.

Figure 2:
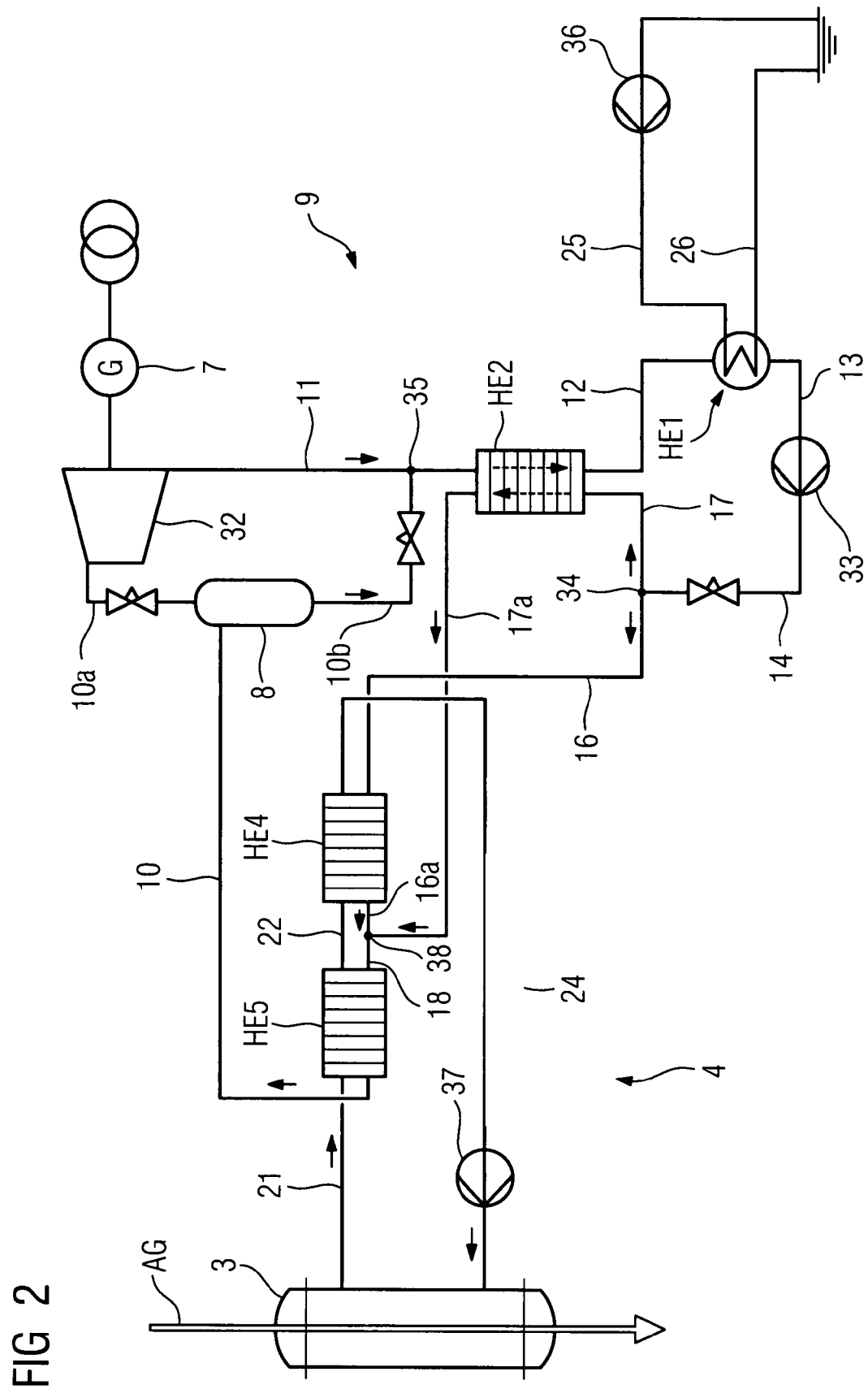
FIG. 2 shows a simplified circuit for describing heat transfer from the waste gases of a gas turbine via a hot water cycle to a Kalina cycle.

Instead of just a single heat exchanger 3, a plurality of heat exchangers—as in the case of FIG. 2—could of course also be provided for heat transfer from the hot water cycle 4 into the Kalina cycle 9. The Kalina cycle comprises a two-substance mixture of water and ammonia as the working medium, water being used as the solvent. The working medium of the Kalina cycle 9 is at least partially evaporated in the heat exchanger 5 by the transfer of heat from the hot water cycle 4 into the Kalina cycle 9—as will be described in detail in connection with FIG. 2.

At least some of the heat from the waste gases AG of the gas turbine 2 are thus transferred in a first step via the heat exchanger 3 to the water of the hot water cycle 4 and in a second step from the water of the hot water cycle 4 via the heat exchanger 5 to the working medium of the Kalina cycle 9, where they are made useful by conversion into mechanical or electrical energy.

The waste gases AG have a temperature in this connection of 400° C. to 650° C. and therefore a temperature which is higher than the decomposition temperature of the ammonia-water mixture of the Kalina cycle 9, which is about 250° C.

At 15 to 25 bar the water of the hot water cycle has a temperature of 200° C. to 220° C. and therefore approximately the evaporation temperature of the working medium of the Kalina cycle.

The hot water cycle 4 can be part of a district heating supply plant for supplying the district heating of private or public facilities, so the efficiency level of the gas turbine plant 1 may be increased further.

The Kalina cycle 9 can in this connection be constructed as a standardized solution which is configured for a pre-defined temperature in the heat exchanger 5. The Kalina cycle 9 is adjusted to the temperature of the waste gases AG by way of the hot water cycle 4. The desired pre-defined temperature in the heat exchanger 5 is adjusted by the dimensioning of the hot water cycle and/or its mode of operation, for example by the pressure and water volume flow thereof.

Additional residual heat contained in the waste gases AG may be made useful by way of an additional Kalina cycle 9'. For this purpose a further heat exchanger 5' for transferring heat that has remained in the waste gas AG to the Kalina cycle 9' is arranged in a vent stack 6 of the gas turbine plant 1. Since the waste gases AG in the vent stack 7 now only have a temperature of 100 to 200° C., heat may be transferred directly from the heat exchanger 5' into the Kalina cycle 9' without interconnecting a hot water cycle. The residual heat that is still contained in the waste gases may be made useful hereby for the generation of mechanical or electrical energy and the flue gas temperature may therefore be reduced to 50 to 70° C.

Transfer of the heat of the waste gases AG from the gas turbine 2 to the Kalina cycle 9 and the utilization thereof by generating electrical energy in the Kalina cycle 9 will now be described in more detail with reference to FIG. 2.

The hot water cycle 4 comprises a hot water pump 37, a heat exchanger 3 constructed as a hot water generator, and two heat exchangers HE4, HE5 connected into the hot water cycle 4. Waste gases (flue gases) AG from a gas turbine flow through the heat exchanger 3, with the heat exchanger being connected to the hot water pump 37 on the one hand and to the heat exchanger HE5 on the other hand. The primary side of the heat exchanger HE5 is in turn connected to the heat exchanger HE4 which is in turn connected to the hot water pump 37 by a connecting line 24.

The hot water pump 37 propels water through the heat exchanger 3 where it is heated by the hot waste gases AG at 15 to 25 bar to 200 to 220° C. The hot water subsequently flows as a flow of hot water 21 or 22 through the primary sides of the heat exchangers HE5 and HE4 where it is cooled and leaves the heat exchanger HE4 as a cooled flow of hot water 24 and flows back to the hot water pump 37 again.

The Kalina cycle 9 comprises the heat exchanger HE5 already mentioned through which the flow of hot water 21 of the hot water cycle 4 flows at the primary side, and which is connected at the secondary side to a mixer 38 on the one hand and by a separator 8 to a turbine 32 on the other hand. The turbine 32 is connected at the output side to the secondary side of a heat exchanger HE2 which is in turn connected to the primary side of a heat exchanger (condenser) HE1. The condenser HE1 is connected at its primary-side output to a divider 34, optionally by way of a condensate tank, by a pump 33. The divider 34 is connected to the mixer 38 on the one hand by the primary side of the heat exchanger HE2 and on the other hand by the secondary side of the heat exchanger HE.

A two-substance mixture of water and ammonia is used as the working medium in the Kalina cycle 9. Downstream of the condenser HE1 the working medium is in a liquid state in the form of a liquid flow of working medium 13. Using the pump 33 the liquid flow of working medium 13 is pumped to an elevated pressure and a pressurized, liquid flow of working medium 14 is produced which is divided by the divider 34 into a first partial flow 16 and a second partial flow 17.

The first partial flow 16 is received at the secondary side of the heat exchanger HE4 and, by using the heat which is generated by cooling the hot water 22 of the hot water cycle 4 that has already been cooled in the heat exchanger HE5, is partially evaporated and a partially evaporated first partial flow 16a is generated. The second partial flow 17 is received at the primary side of heat exchanger HE2 and, by using the heat which is generated by partial condensation of a relaxed flow of working medium 11 received at the secondary side, is partially evaporated and a partially evaporated second partial flow 17a is generated. The partially evaporated first and second partial flows 16a, 17a are subsequently combined in the mixer 38 to give a partially evaporated flow of working medium 18. The heat exchangers HE2 and HE4 are advantageously dimensioned in this connection such that the first and second partially evaporated partial flows 16a and 17a have approximately the same temperature and the same steam content.

The partially evaporated flow of working medium 18 is subsequently received at the secondary side of the heat exchanger HE5, evaporated further by cooling of the primary-side hot water 21 of the hot water cycle 4 and the at least partially evaporated flow of working medium 10 is generated.

The partially evaporated flow of working medium 10 is supplied to the separator 8 in which a vapor phase 10a is separated from a liquid phase 10b of the partially evaporated flow of working medium 10. The vapor phase 10a is subsequently relaxed in the turbine 2, its energy converted into power by the generator 7 and the relaxed flow of working medium 11 generated. The relaxed flow of working medium 11, together with the liquid phase 10b supplied by a mixer 5, is partially condensed in the heat exchanger HE2 and a partially condensed, relaxed flow of working medium 12 generated. The partially condensed, relaxed flow of working medium 12 is subsequently condensed in the heat exchanger (condenser) HE1 using a flow of cold water 25 being supplied by a cold water pump 36, and the liquid flow of working medium 13 generated. The heat transferred to the flow of cold water 25 by the condensation of the relaxed flow of working medium 12 is removed by the flow of cold water 26 that is draining away.

The invention has been described above with reference to preferred embodiments but in general cannot be regarded as being limited to these embodiments. Instead there is the possibility of a large number of variations and modifications to the invention and its embodiments. For example the number of heat exchangers may be varied in the cycles 4 and 9 and additional valves and separators may be connected into the circuit. The gaseous flow of working medium 10 for example may moreover be relaxed in more than one step, for example across two turbines connected in series. It is also within the scope of the invention for heat to be transferred from the heat source to the cycle with the working medium comprising at least two substances with non-isothermal evaporation and condensation via a plurality of cycles instead of via just one.

The invention claimed is:

1. A method for the transfer of heat from a heat source to a thermodynamic cycle, comprising:
    providing a working medium comprised of a plurality of substances which are mixed to form a mixed substance having non-isothermal evaporation and condensation characteristics;
    transferring heat from the heat source to a liquid of a hot liquid cycle; and
    transferring heat from the heated liquid to the thermodynamic cycle having the working medium wherein a temperature of the heated liquid is lower than a temperature of the working medium.

2. The method as claimed in claim 1, wherein the heat source has a temperature value greater than a decomposition temperature of the working medium.

3. The method as claimed in claim 2, wherein the heat source is hot waste gas from a gas turbine.

4. The method as claimed in claim 2, wherein the heated liquid has substantially the evaporation temperature of the working medium.

5. The method as claimed in claim 4, wherein the thermodynamic cycle having the working medium is a Kalina cycle.

6. The method as claimed in claim 5, wherein the working medium consists of two substances being ammonia and water.

7. The method as claimed in claim 6, wherein the hot liquid cycle is a hot water cycle.

8. The method as claimed in claim 7, wherein the heated liquid of the hot water cycle supplied to a district heating supply.

9. A device for the transfer of heat energy from a heat source to a thermodynamic cycle, comprising:
    a working medium having a plurality of substances which are mixed to form a mixed substance having non-isothermal evaporation and condensation characteristics;
    a first heat exchanger for transferring heat energy from the heat source to a liquid of a hot liquid cycle; and
    a second heat exchanger connected to the first heat exchanger that transfers heat energy from the heated liquid of the hot liquid cycle to the working medium wherein the working medium is a working medium of the thermodynamic cycle and wherein a temperature of the heated liquid is lower than a decomposition temperature of the working medium.

10. The device as claimed in claim 9, wherein the heat source has a temperature value greater than a decomposition temperature of the working medium.

11. The device as claimed in claim 10, wherein the first heat exchanger is arranged in a waste gas stream of a gas turbine.

12. The device as claimed in claim 11, wherein the liquid from the hot liquid cycle has substantially the evaporation temperature characteristics of the working medium.

13. The device as claimed in claim 12, wherein the working medium is a working medium of a Kalina cycle.

14. The device as claimed in claim 13, wherein the working medium consists of two substances being ammonia and water.

15. The device as claimed in claim 14, wherein the hot liquid cycle is a hot water cycle.

16. The device as claimed in claim 15, wherein the hot water cycle is a thermodynamic cycle of a district heating supply plant.

17. A gas turbine plant, comprising:
- a gas turbine engine having a shaft that combusts a fuel to produce shaft power and a hot exhaust gas stream;
- a generator attached to the gas turbine shaft to produce an electrical output of the generator;
- a first heat exchanger arranged in the hot exhaust gas stream for transferring heat energy from the hot exhaust gas stream to a liquid of a hot liquid cycle; and
- a second heat exchanger connected to the first heat exchanger that transfers heat energy from the heated liquid of the hot liquid cycle to a working medium of a thermodynamic cycle, wherein,
- the working medium has a plurality of substances which are mixed to form a mixed substance having non-isothermal evaporation and condensation characteristics wherein a temperature of the heated liquid is lower than a decomposition temperature of the working medium, and
- the thermodynamic cycle increases the overall thermal efficiency of the plant.

18. The plant as claimed in claim 17, wherein the thermodynamic cycle is a Kalina cycle.

19. The plant as claimed in claim 18, wherein the working medium of the Kalina cycle is a mixture of ammonia and water.

20. The plant as claimed in claim 19, wherein the hot liquid cycle is a hot water cycle.

* * * * *